Figure 1:
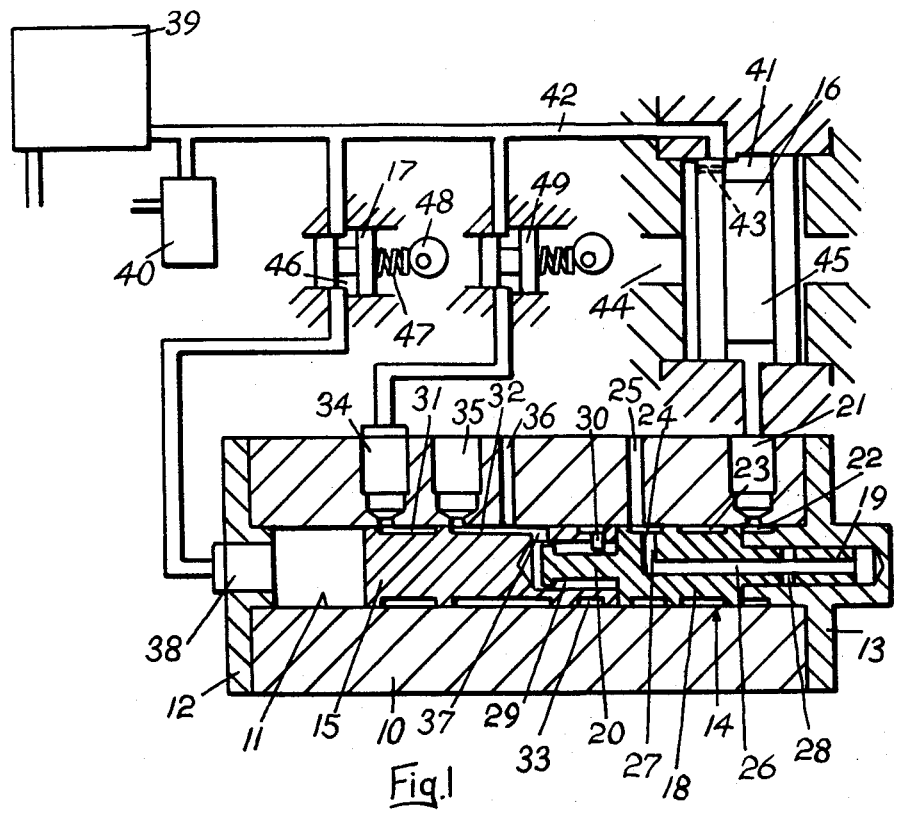

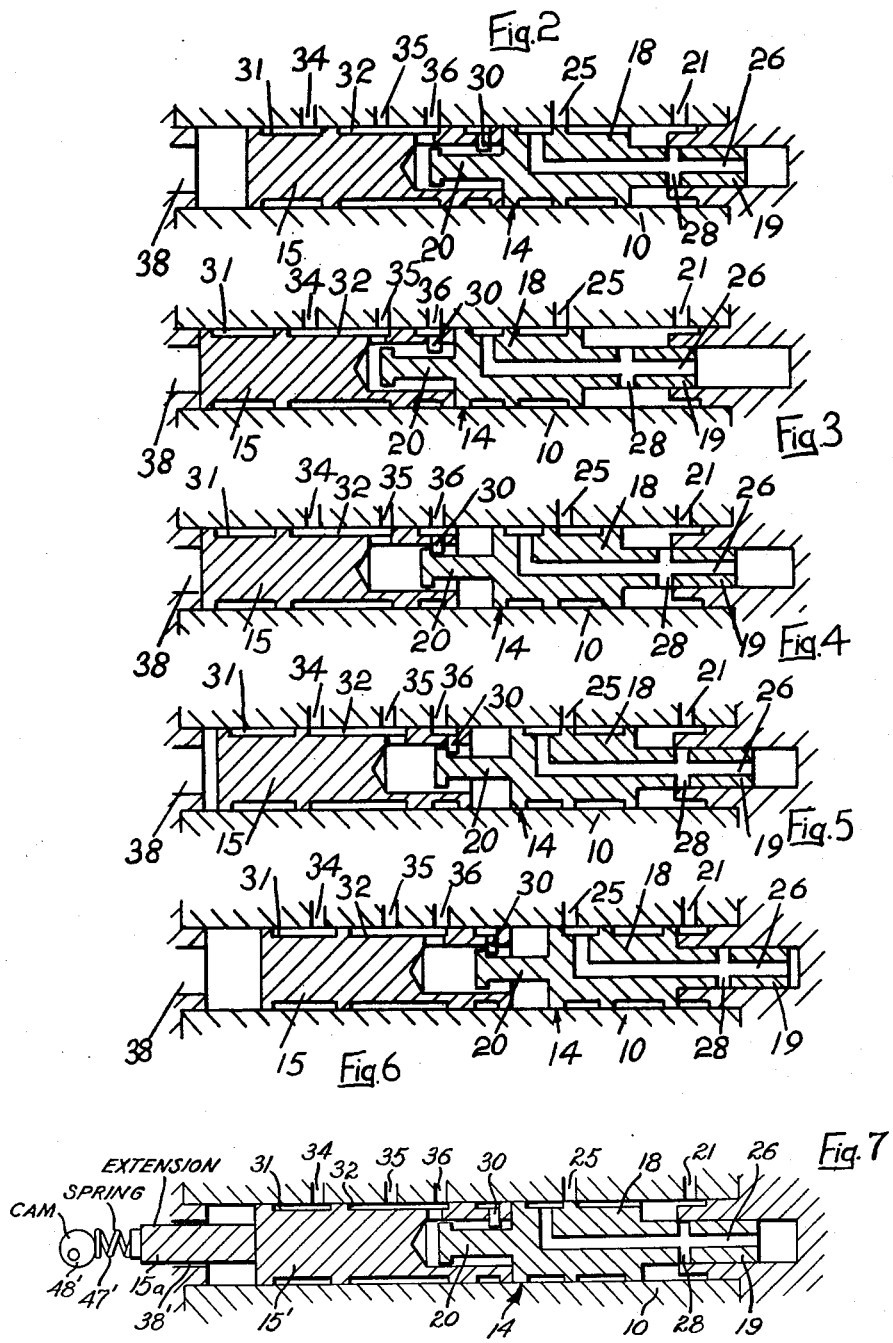

United States Patent Office 3,119,414
Patented Jan. 28, 1964

3,119,414
MEANS FOR AUTOMATICALLY CONTROLLING SPEED CHANGES IN VARIABLE SPEED POWER TRANSMISSION MECHANISMS
Alan Salisbury Lamburn, Kencott, via Lechlade, England, assignor to Auto Transmissions Limited, Canley, England
Filed June 16, 1961, Ser. No. 117,731
Claims priority, application Great Britain June 29, 1960
4 Claims. (Cl. 137—625.69)

This invention relates to means for controlling mechanisms employed for effecting speed changes in variable-speed power transmission-mechanisms.

Means in accordance with the invention embodies a control valve which includes two co-axial pistons contained in a ported body part, and means for applying a variable force to the outer end of each piston, the pistons being connected together by a lost motion connection so as to be movable as a pair in one axial direction when the force applied to the outer end of one piston exceeds the force applied to the outer end of the other piston, said connection between the pistons being also arranged to permit of one piston moving relative to the other piston in the opposite axial direction under the control of the pressure of a motive fluid admitted between the two pistons.

The invention will now be more particularly described with reference to the accompanying drawings wherein FIGURE 1 is a diagrammatic view showing one example of means constructed in accordance with the invention. FIGURES 2–6 are sectional views showing respectively various stages in the operation of the control valve which is shown in FIGURE 1, and FIG. 7 is a view similar to FIG. 2 illustrating a further embodiment of the invention.

Referring to the drawings the example of control means shown therein is adapted to use in controlling an epicyclic overdrive or underdrive power-transmission mechanism for vehicles, the speed change of this mechanism being effected by a fluid operated clutch. Said control means includes a valve for controlling the flow of motive fluid to and from the clutch actuating means, and the valve has a body part 10 having therein a longitudinal bore 11 which is closed at each end by covers 12 and 13 attached to the body part. In the body part are provided various ports to be hereinafter specified.

Within the bore 11 are contained two pistons hereinafter referred to as 14 and 15. Piston 14 is operable by a motive fluid under the control of a valve 16 (as will be later described) which can be actuated by fluid the pressure of which is related to the speed of the vehicle. Piston 15 serves to control the flow of motive fluid to and from the actuating means of the change-speed clutch, and is movable in one direction by piston 14 and in the opposite direction by endwise pressure applied to its outer end by motive fluid under the control of a valve 17 or by spring means associated with the engine throttle as will also be described later.

Piston 14 is of stepped form in that it comprises three parts of different diameters. One of these parts is the main part 18 and is of the same diameter as the bore 11 in the body part. Another part 19, which extends from one end of the main part 18 is of smaller diameter and occupies a bore formed in an inward extension of the adjacent end cover 13 which projects into the bore 11. A third part 20 of smaller diameter than part 18 extends from the other end of the main part 18 into a bore in the adjacent end of the piston 15. The port 21 in the body part 10 which receives the motive fluid for actuating the piston 14 is located adjacent to the inner end of the said extension of cover 13 and conveys the fluid to an annular groove 22 around the extension, this groove being flanked at one edge by the step in the piston 14. Around the main part of the piston 14 are formed annular grooves 23 and 24, and the land between these grooves serves to control an exhaust passage 25 for discharge of the motive fluid which actuates this piston. Further there is formed in this piston and axial bore 26 which is open at the end which occupies the bore in the said extension of the cover 13. At the closed end of the bore 26 is formed a radial passage 27 in communication with the annular groove 24 located adjacent to the end of the main part of the piston. A second radial passage 28 is formed in the part 19 of the piston, said passage 28 being controlled by the extension of the cover.

The end part 20 of piston 14 which occupies the said bore in piston 15 has formed around it a broad annular groove 29 which by co-operation with a stop 30 on piston 15 serves to limit the relative axial freedom of the two pistons so that the two pistons are in effect connected together by a lost motion connection. Piston 15 has formed around it three annular grooves 31, 32, 33 which serve to control three ports 34, 35, 36 in the body part. One of these ports 34 serves to convey motive fluid to the second port 35 which will be connected to the clutch to be actuated. The third port 36 serves as an exhaust port. Also the intermediate annular groove 32 on piston 15 communicates by way of hole 37 in the piston with the bore which contains the extension of piston 14. In the end cover 12 is formed an inlet 38 for motive fluid admitted through the valve 17 associated with the engine throttle, which fluid serves to move the pistons in the opposite direction to that imparted by the pressure of the fluid associated with engine speed acting on piston 14.

The motive fluid is supplied by a pump 39 to a distributing system at a pressure which is determined by a spring loaded relief valve 40, this pressure being sufficient to actuate the pistons 14 and 15 of the control valve above described.

The fluid which acts on piston 14 is admitted through the aforesaid piston valve 16 having a surrounding groove 41 between its ends and which is contained in a correspondingly stepped cylinder. Said groove 41 can communicate with a fluid admission passage 42 and also communicates with one end of the cylinder through a bleed hole 43 in the piston, and this end of the cylinder is provided with an exhaust passage 44. The other end of the cylinder is provided with a passage 45 for admission of a fluid employed for actuating the piston valve 16. This actuating fluid is supplied at a pressure related to the speed of the vehicle, and may be conveyed to the passage 45 by a Pitot tube from a system in which fluid is circulated by a pump driven by the output shaft of the power transmission mechanism of the vehicle. The mode of action is such that the valve 16 is held closed by the motive fluid supplied by pump 39 acting on the stepped piston 16 until the speed of the vehicle attains a predetermined rate. At that speed said valve 16 is opened by the actuating fluid entering via passage 45 and admits motive fluid to the piston 14 of the control valve.

For controlling the motive fluid required to act on piston 15 there is provided the aforesaid valve which comprises a stepped piston 17 having a surrounding groove 46 between its ends, and contained in a correspondingly stepped cylinder. This piston is loaded by a spring 47 with which is combined a cam 48 for varying the pressure exerted by the spring. The cam 48 is operatively connected to the driver-actuated engine throttle, and serves to move the piston 17 towards its open position. A similar valve may also be provided for supplying the fluid required for actuating the speed-change clutch under the control of piston 15, this valve being indicated by reference numeral 49 and receiving motive fluid from the supply line connected to the pump 39. Alternatively, instead of having a piston valve 17 controlled by spring 47 and cam 48 connected to the engine throttle (thereby controlling motive fluid acting on piston 15) a spring 47' can be arranged to act directly on the end of piston 15' by providing the latter with an extension 15a which projects through an opening 38', the pressure exerted by said spring being controlled by cam 48' connected to the engine throttle as before. Thus piston 15' may be movable in one direction (i.e. from left to right as shown in the drawings) either by pressure of motive fluid or by spring pressure.

The mode of action of the system above described is as follows:

So long as the speed of the vehicle remains below the predetermined rate, the pistons occupy the initial position as shown in FIGURE 1 under the action of the motive fluid (entering the port 38) on piston 15. In this condition the port 35 is open to exhaust through the piston 15, port 35 being connected to exhaust port 36 via the groove 32. When the appropriate speed is reached the valve 16 responsive to vehicle speed is opened, thereby increasing the pressure acting on piston 14 against the pressure on piston 15 and a small initial movement is given to both pistons, as shown in FIGURE 2. The effect of this movement is to enable the motive fluid to act now on the main part 18 of the piston 14 and the end part 19 so enabling a rapid movement to be given to both pistons 14, 15, as shown in FIGURE 3, and causing the clutch-actuating means to be brought into action, since port 35 will now be connected to the port 34 (admitting pressure fluid) via groove 32. Concurrently motive fluid is admitted to the bore in piston 15, causing piston 14 to be returned partially towards its initial position i.e. to the right as shown in FIGURE 4, its movement being limited by pin 20 acting on the larger diameter of extension 29. Motive fluid still acts however on the main part 18 and the end part 19 of piston 14 so that a lower pressure of motive fluid entering through port 21 (as compared with the initial pressure which acts on part 18 only) will be sufficient to enable the piston 15 to retain the position shown in FIGURES 3 and 4, so that said clutch-activated means will still be in action. Vehicle speed can thus be reduced to a value below that at which the clutch actuating means has brought into action (thereby introducing a hysteresis effect) before said means is de-energised or released. With increase of the pressure acting on piston 15 under the control of the engine throttle or with continuing reduction of speed and consequent reduction of the pressure acting on piston 14 the latter will eventually reach a position in which the radial passage 28 is closed as seen in FIGURE 5. Continued movement to the right results in the bore 26 communicating with the exhaust port 25 via passage 27 and the area of piston 14 on which acts the pressure related to speed is thereby reduced, and the predominance of the pressure under the control of the engine throttle then causes a rapid movement of both pistons to their initial positions, as shown in FIGURE 4, whilst port 35 again becomes connected to the exhaust port 36 so that the means for actuating the speed change clutch is inoperable.

Thus, an important feature of the control valve above described is that is possesses an inherent hysteresis which introduces a lag between the vehicle speeds and/or the throttle positions at which the control valve moves in its two directions.

The invention is applicable in like manner to the control of an epicyclic or other power transmission mechanism adapted to provide a range of speed changes. In, for example, a 5-speed mechanism, four twin piston control valves are provided, each having associated with it a speed responsive valve and a common valve (or an individual spring) for controlling the pressure acting on piston 15, these valves being appropriately adapted to become effective at different speeds and different positions of the engine throttle.

Having thus described my invention what I claim as new and desire to secure by Letters Patent is:

1. A valve assembly for controlling fluid flow to and from a point of utilization, comprising a body having a longitudinally extending bore therein, first and second pistons mounted coaxially in said bore, each piston having inner and outer ends, a motive fluid entrance port communicating with said bore, a utilization port communicating with said bore, an exhaust port communicating with said bore, cooperating valving surfaces on said second piston and said bore adjacent said ports for alternately communicating said utilization port with said exhaust port and with said motive fluid entrance port, means for applying a variable force to the outer end of each piston, a source of motive fluid, means operably connected with the source of motive fluid for admitting fluid into said bore, said variable force applying means for said second piston normally biasing said second piston into engagement with said first piston whereby said utilization port is normally in communication with said exhaust port, means on said first piston cooperating with said variable force applying means associated therewith to first slowly then rapidly shift said first piston to a position where said entrance port communicates with said utilization port when said first piston variable applying force is greater than the force applied to said second piston, and passage means between said utilization port and the inner end of said first piston.

2. The valve assembly as claimed in claim 1, in which the means for applying force to the outer ends of said pistons includes fluid pressure carrying conduit means.

3. The valve assembly as claimed in claim 1, in which the means for applying the variable force to the outer end of said second piston comprises spring means operably associated with the outer end of such piston.

4. The valve assembly as claimed in claim 1, in which said means on said first piston cooperating with said variable force applying means comprise an extension of reduced cross sectional area on the outer end of said first piston and passage means communicating said variable force applying means to said outer end portion of said extension only when said first piston moves a predetermined axial distance away from the extension end of the bore, the pressure on said end surface being relieved on return of the first piston in the opposite axial direction before the initial position is reached.

References Cited in the file of this patent

UNITED STATES PATENTS

| | | |
|---|---|---|
| 2,639,693 | Miller et al. | May 26, 1953 |
| 2,765,889 | Court | Oct. 9, 1956 |
| 2,782,802 | Lassen | Feb. 26, 1957 |
| 2,787,294 | Carriol | Apr. 2, 1957 |
| 2,919,597 | Borman | Jan. 5, 1960 |
| 3,050,081 | Johnston | Aug. 21, 1962 |